(12) United States Patent
Mizoguchi et al.

(10) Patent No.: US 11,757,799 B2
(45) Date of Patent: Sep. 12, 2023

(54) LINE MONITOR DEVICE AND NETWORK SWITCH

(71) Applicant: DENSO CORPORATION, Kariya (JP)

(72) Inventors: Shota Mizoguchi, Kariya (JP); Takahiro Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 171 days.

(21) Appl. No.: 17/329,708

(22) Filed: May 25, 2021

(65) Prior Publication Data

US 2021/0281527 A1 Sep. 9, 2021

Related U.S. Application Data

(63) Continuation of application No. PCT/JP2019/046132, filed on Nov. 26, 2019.

(30) Foreign Application Priority Data

Dec. 5, 2018 (JP) ................................. 2018-228497

(51) Int. Cl.
*H04L 12/28* (2006.01)
*H04L 49/901* (2022.01)
*H04L 49/55* (2022.01)

(52) U.S. Cl.
CPC .......... *H04L 49/901* (2013.01); *H04L 49/555* (2013.01)

(58) Field of Classification Search
CPC ..... H04L 49/901; H04L 12/28; H04L 49/555; H04L 12/44
See application file for complete search history.

(56) References Cited

U.S. PATENT DOCUMENTS

| 7,644,147 | B1* | 1/2010 | Wohlgemuth .... G06F 15/17375 709/223 |
| 8,725,854 | B2* | 5/2014 | Edsall ..................... G06F 3/067 711/6 |
| 9,760,322 | B2* | 9/2017 | Hamada .............. H04L 41/0806 |
| 11,537,533 | B2* | 12/2022 | Litichever ............ G06F 13/107 |
| 2005/0114464 | A1* | 5/2005 | Amir ................... H04L 67/1097 709/213 |
| 2010/0238003 | A1* | 9/2010 | Chan ................... H04L 12/2818 340/538 |
| 2011/0314325 | A1* | 12/2011 | Nakayama ................ G06F 1/28 713/340 |
| 2014/0341224 | A1* | 11/2014 | Armbruster ............. H04L 49/30 370/395.53 |
| 2015/0067221 | A1* | 3/2015 | Fujitani ............... H04L 12/6418 710/301 |
| 2016/0292104 | A1* | 10/2016 | Mizumoto ........ H04L 12/40169 |
| 2017/0026264 | A1 | 1/2017 | Ishikawa et al. |

FOREIGN PATENT DOCUMENTS

| JP | 2008022188 A | 1/2008 |
| JP | 2017028431 A | 2/2017 |
| JP | 2018042128 A | 3/2018 |

\* cited by examiner

*Primary Examiner* — Abdelnabi O Musa
(74) *Attorney, Agent, or Firm* — Harness, Dickey & Pierce, P.L.C.

(57) ABSTRACT

A network switch includes a plurality of ports each connected to a network or a terminal. The network switch performs routing between the plurality of ports. A control device is apart from the network switch. The control device controls the network switch. The network switch includes a command storage unit. The command storage unit stores a plurality of commands acquired from the control device for physical devices.

17 Claims, 8 Drawing Sheets

FIG. 3

| | PHY COMMAND (NETWORK SWITCH → PHY) | | | |
|---|---|---|---|---|
| BASIC FORMAT | ATTRIBUTE 1byte | ADDRESS 1byte | WRITE DATA 2byte | |
| | READ : 0 WRITE : 1 | DESIGNATE REGISTER IN PHY | IGNORE WHEN ATTRIBUTE IS READ | |
| READ COMMAND PHY_ID PHY_LINK PHY_INF etc. | 0 | CORRE- SPONDING REGISTER | — | |
| WRITE COMMAND PHY_RESET PHY_REG_SET etc. | 1 | CORRE- SPONDING REGISTER | (SETTING DATA) | |

FIG. 4

| | UPPER-LEVEL COMMAND (CONTROL DEVICE → NETWORK SWITCH) | | |
|---|---|---|---|
| INITIAL- IZATION COMMAND | COMMAND TYPE (INITIALIZATION) | TARGET REGISTER (COMMAND REGISTER) | WRITE DATA: COMMAND |
| EXECUTION COMMAND | COMMAND TYPE (EXECUTION) | TARGET REGISTER (COMMAND REGISTER) | TARGET PHY |

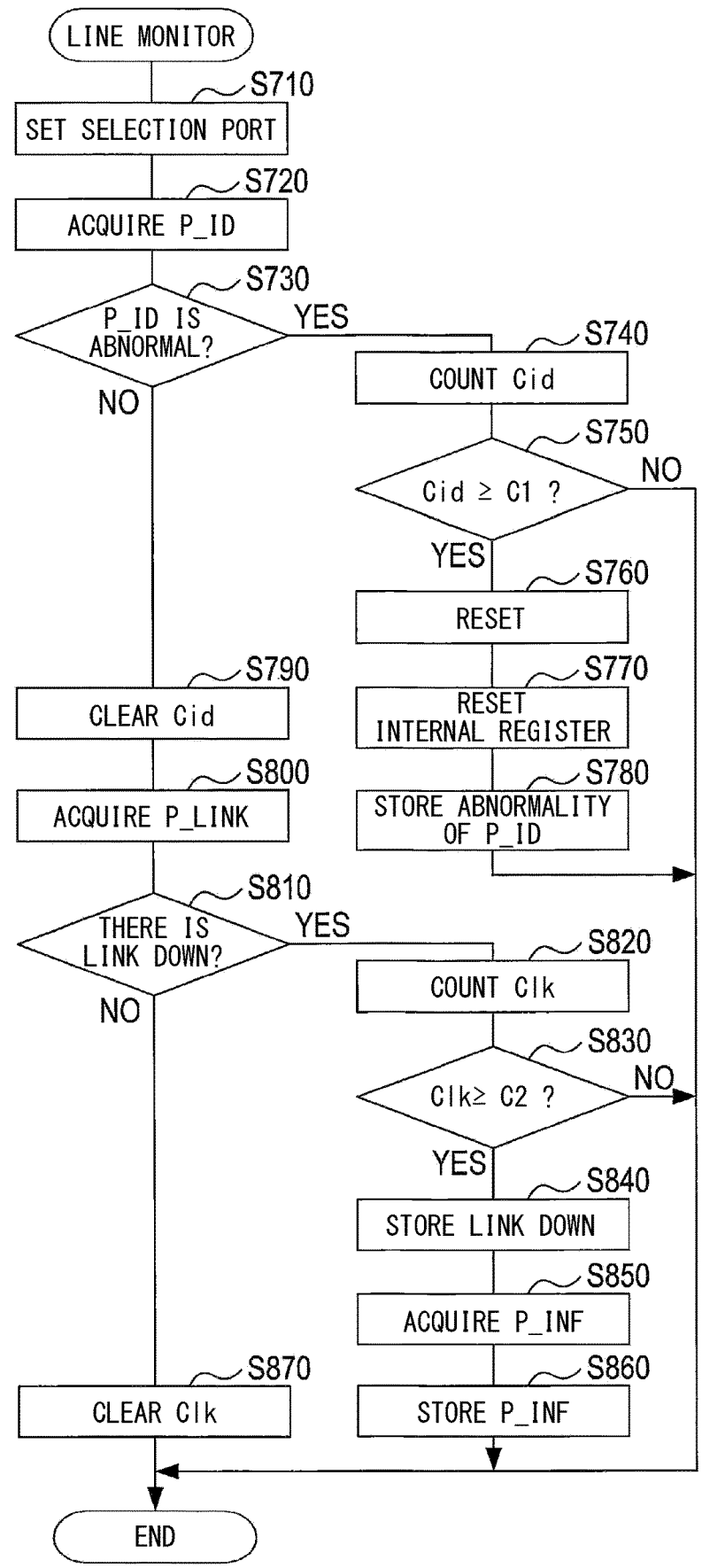

LINE MONITOR DEVICE AND NETWORK SWITCH

CROSS REFERENCE TO RELATED APPLICATIONS

The present application is a continuation application of International Patent Application No. PCT/JP2019/046132 filed on Nov. 26, 2019, which designated the U.S. and claims the benefit of priority from Japanese Patent Application No. 2018-228497 filed on Dec. 5, 2018. The entire disclosures of all of the above applications are incorporated herein by reference.

TECHNICAL FIELD

The present disclosure relates to a line monitor device and a network switch for monitoring a line connected to a port of the network switch.

BACKGROUND

In a device that has multiple ports to which a network or terminal is connected and includes a network switch that routes between the ports, a line monitor processing that monitors whether the line connected to each port is operating normally is executed. The line monitor processing is performed by a control device that controls the network switch reading an internal register of a PHY, which is a device that controls a physical layer of an OSI reference model.

SUMMARY

The present disclosure provides a network switch. The network switch includes a plurality of ports each connected to a network or a terminal. The network switch performs routing between the plurality of ports. A control device is apart from the network switch. The control device controls the network switch. The network switch includes a command storage unit. The command storage unit stores a plurality of commands acquired from the control device for physical devices.

BRIEF DESCRIPTION OF DRAWINGS

The features and advantages of the present disclosure will become more apparent from the following detailed description made with reference to the accompanying drawings. In the drawings:

FIG. 3 is an explanatory diagram showing a structure of a PHY command;

FIG. 4 is an explanatory diagram showing a structure of a higher-level command;

FIG. 9 is a flowchart of a line monitor processing according to a second embodiment.

DETAILED DESCRIPTION

Figure 1:
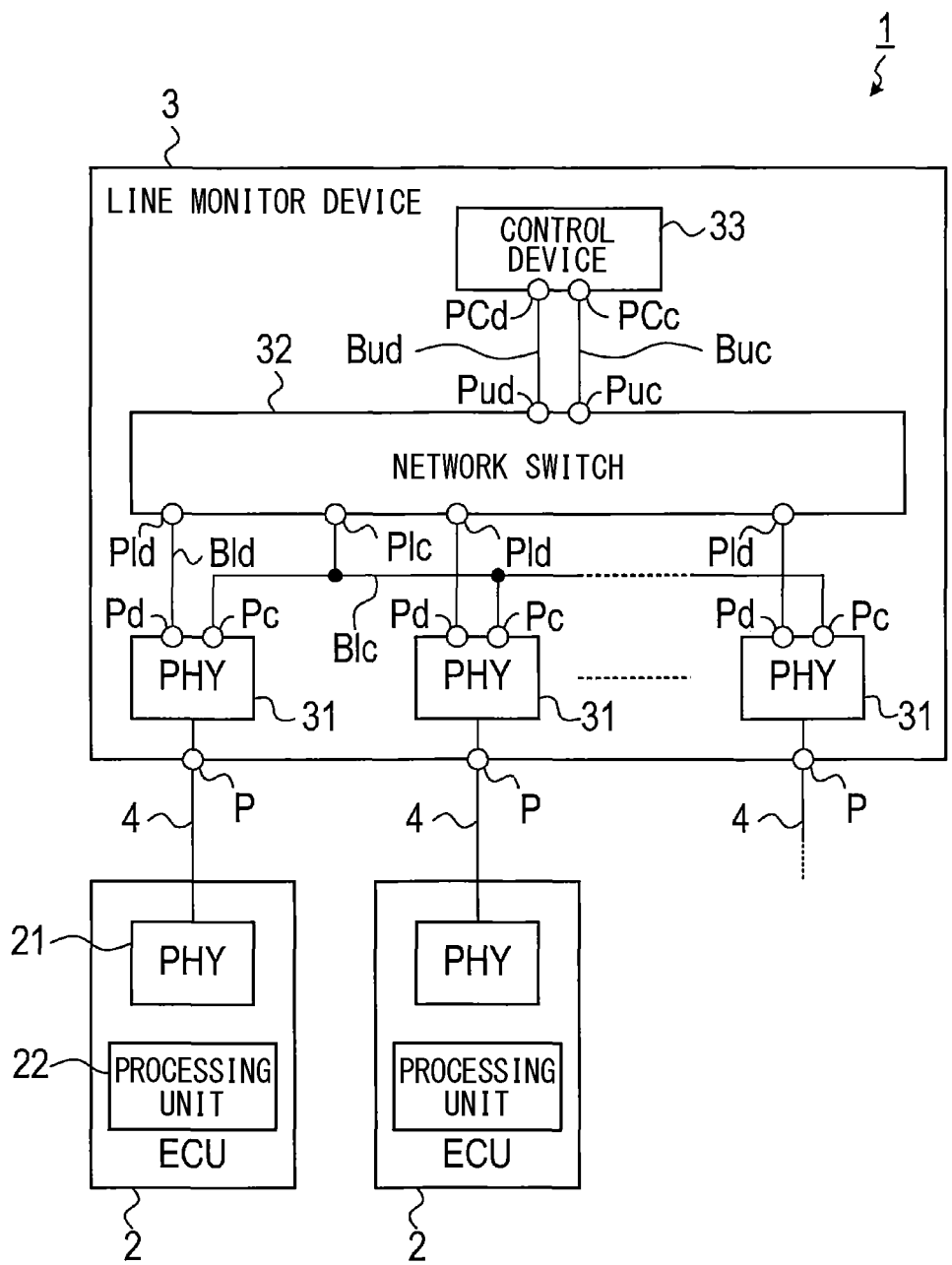
FIG. 1 is a block diagram showing a configuration of an in-vehicle network system.

For example, in an in-vehicle network configured by a network switch, the number of ports accommodated in the network switch increases as the number of ECUs constituting the network increases. Further, in particular, in a vehicle that automatically drives, it is necessary to periodically perform a line monitor processing in order to ensure safety, and it is necessary to increase the frequency.

As a result, the load of the line monitor processing performed by the control device increases, and the amount of communication between the control device and the network switch increases. Thus, routing, which is the original function of the network switch, may be affected.

For example, a technique that reduces an amount of communication between a control device and a network switch is disclosed. The technique collectively confirms states of a plurality of PHYs in response to an instruction from the control device and incorporates hardware that responds to the confirmation result to the control device into the network switch.

However, as a result of detailed examination by the inventor, it has been found that the technique lacks versatility because a function of confirming the PHY state is realized by hardware. That is, in the technique, it is necessary for the network switch to be re-established each time a control method is changed due to a change in a PHY specification or a new function other than confirming a link state is added.

The present disclosure provides a technique for dealing with a change in a physical device without redesigning a network switch.

An exemplary embodiment of the present disclosure provides a line monitor device. The line monitor device includes a network switch and a control device. The network switch has a plurality of ports each connected to a network or a terminal and is configured to perform routing between the plurality of ports. The control device is apart from the network switch and is configured to control the network switch. The network switch includes a command storage unit and an access control unit. The command storage unit stores a plurality of commands acquired from the control device for physical devices such that the plurality of commands correspond to command designation information predetermined. The physical devices are correspondingly provided for the plurality of ports and each of the physical devices realizes a physical layer. When acquiring device designation information that designates one of the physical devices and simple command that has the command designation information from the control device, the access control unit reads a command from the command storage unit based on the command designation information indicated by the simple command and execute the command to the physical device designated by the device designation information indicated by the simple command. The control device instructs the command storage unit to write the plurality of commands using an initialization command for writing the plurality of commands to the command storage unit. The control device performs a line monitoring processing that monitors a line connected to each of the physical devices using the simple command.

Another exemplary embodiment of the present disclosure provides a network switch. The network switch has a plurality of ports each connected to a network or a terminal and is configured to perform routing between the plurality of ports. The network switch includes a command storage unit and an access control unit. The command storage unit stores a plurality of commands for physical devices acquired from a control device that controls the network switch such that the plurality of commands correspond to command designation information predetermined. The physical devices are correspondingly provided for the plurality of ports and each of the physical devices realizes a physical layer. When acquiring device designation information that designates one of the physical devices and simple command that has the command designation information from the control device, an access control unit reads a command from the command storage unit based on the command designation information indicated by the simple command and execute the command to the physical device designated by the device designation information indicated by the simple command.

In the exemplary embodiment of the present disclosure, the command to be executed for the physical device is stored in the network switch. Therefore, when the command for the physical device is executed, the control device can give an instruction using a simple command to the network switch. The simple command is provided by the command designation information that designates the command to be executed and the device designation information that designates the physical device to which the command is executed. That is, since it is not necessary to designate the content of the specific command, the amount of communication between the control device and the network switch can be reduced.

The network switch executes the command and does not need to process the information obtained from the physical device. Therefore, even when the specification of the physical device is changed, the command used by the physical device after the specification change needs to be rewritten but there is no need to change the hardware. In other words, it is possible to easily deal with the change in the physical device simply by modifying the software of the control device.

Embodiments of the present disclosure will be described below with reference to the drawings.

1. First Embodiment (1-1. Configuration)

An in-vehicle network system 1 shown in FIG. 1 includes a plurality of ECUs 2 and a line monitor device 3. The line monitor device 3 includes a plurality of external ports P. Each external port P is connected to one of the ECUs 2 via a transmission line 4. A network having the plurality of ECUs 2 may be connected to each external port P.

The ECU 2 includes a physical device (hereinafter, PHY) 21 that realizes the physical layer in the OSI reference model, and a terminal processing unit 22.

In the PHY 21, a transceiver in accordance with communication protocol used with the line monitor device 3 is used, and specifically, an Ethernet transceiver, a CAN transceiver, or the like is used. Both Ethernet and CAN are registered trademarks. CAN is an abbreviation for Controller Area Network.

The terminal processing unit 22 includes a microcomputer having a CPU and a semiconductor memory such as a RAM or a ROM, and executes various processes assigned to the ECU 2.

The line monitor device 3 includes a plurality of PHYs 31, a network switch 32, and a control device 33.

The network switch 32 has data lower-level ports Pld, one data upper-level port Pud, one control lower-level port Plc, and one control upper-level port Puc. The number of the data lower-level ports Pld is same as the number of the external ports P.

Each of the plurality of data lower-level ports Pld is connected, via the data lower-level bus Bld, to the data port Pd of one of the plurality of PHYs 31 on a one-to-one basis. The control lower-level port Plc is connected, via the control lower-level bus Blc, to the control ports Pc of all PHYs 31 on a one-to-many basis.

The data upper-level port Pud is connected to a data port PCd of the control device 33 via the data upper-level bus Bud. The control upper-level port Puc is connected to a control port PCc of the control device 33 via the control upper-level bus Buc.

The data ports Pd, Pld, Pud, and PCd of the PHY 31, the network switch 32, and the control device 33 realize the MII. MII is an abbreviation for Media-Independent Interface, which is a standard interface for connecting a MAC of high-speed Ethernet and a PHY chip. That is, each of the data lower-level bus Bld and the data upper-level bus Bud function as a MII bus.

Each of the control ports Pc and Plc between the PHY 31 and the network switch 32 realizes an MDIO interface. MDIO is an abbreviation for Management Data Input/Output, and the MDIO interface is adopted in IEEE802.3ae and is an interface for enabling access to the internal register of the PHY 31. That is, the control lower-level bus Blc functions as an MDIO bus.

Each of the control external ports Puc and PCc between the network switch 32 and the control device 33 realizes an SPI or I2C interface. SPI is an abbreviation for Serial Peripheral Interface, and I2C is an abbreviation for Inter-Integrated Circuit. The SPI and I2C interfaces are both standards for synchronous serial communication. That is, the control upper-level bus Buc functions as an SPI bus or an I2C bus.

The interface realized by each port of the network switch 32 is not limited to the above-mentioned interface.

The PHY 31 is a physical device similar to the PHY 21. PHYs 31 that realize the same communication protocol may be adopted for all external ports P, or a PHY 31 that realizes a different communication protocol for each external port P may be adopted.

The PHY 31 includes a plurality of internal registers, and realizes various controls by accessing these internal registers. Specifically, the configuration is capable of setting the operation of the PHY 31, resetting the PHY 31, acquiring information on the state of the PHY 31 (hereinafter, state information), and acquiring information unique to the PHY 31 (hereinafter, unique information). The state information includes at least a link state P_LINK indicating connection or disconnection of the link and a device information P_INF indicating the state of the PHY 31. Further, the unique information includes at least identification information P_ID unique to each PHY 31.

(1-2. Network Switch)

Figure 2:
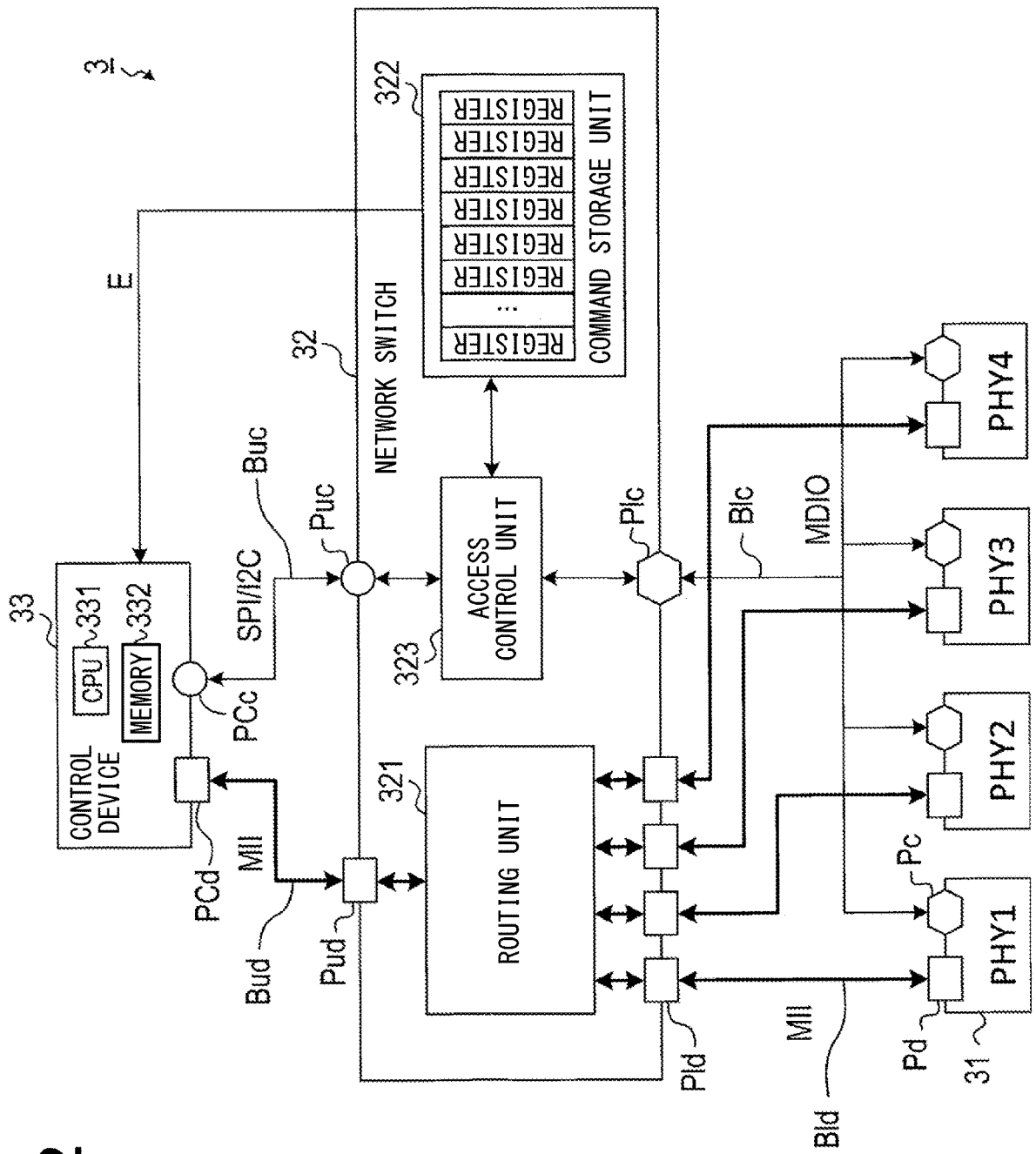
FIG. 2 is a block diagram showing a configuration of a control monitor device.

As shown in FIG. 2, the network switch 32 includes a routing unit 321, a command storage unit 322, and an access control unit 323. Each function of the network switch 32 is realized by hardware using FPGA or the like. FPGA is an abbreviation for Field Programmable Gate Array.

The routing unit 321 sets a route for connecting a data upper-level port Pud, as an input source, and a data lower-level port Pld, as an output destination, according to the MAC address indicated in the communication frame input via the data lower-level port Pld, and relays the communication frame. The communication frame addressed to the line monitor device 3 is supplied to the control device 33 via the data upper-level port Pud.

The command storage unit 322 has a plurality of command registers each of which stores a PHY command used for accessing the internal register of the PHY 31.

The PHY command stored in the command storage unit 322 includes "attribute information", "address", and "write data" as shown in a basic format in FIG. 3. The "attribute information" indicates the access type of the command, that is, read or write. The "address" indicates which of the plurality of internal registers of the PHY 31 is designated. The "write data" is validated when the access type indicated by the "attribute information" is write (that is, the write command), and indicates data to be written to the internal register designated by the address. Note that the "write data" is ignored when the access type is read (that is, the read command).

Here, the read command includes at least a PHY_ID command, a PHY_LINK command, and a PHY_INF command. The PHY_ID command reads the identification information P_ID of the PHY 31 from the internal register. The PHY_LINK command reads the link state P_LINK of the PHY 31 from the internal register. The PHY_INF command reads the device information P_INF of the PHY 31 from the internal register. Further, the write command includes at least a PHY_REST command and a PHY_REG_SET command. The PHY_REST command resets the PHY 31. The PHY_REG_SET command sets data to a designated internal register.

Returning to FIG. 2, the command storage unit 322 is configured by using an ECC memory. ECC is an abbreviation for Error correcting code. In the ECC memory, an error correcting code (hereinafter referred to as ECC) is generated when the data is written, and the generated ECC is stored together with the data. When the data is read, the ECC generated from the read data is compared with the stored ECC. When the generated ECC mismatches with the stored ECC, an error bit is corrected using the stored ECC and the data stored in the memory is corrected. The configuration is capable of correcting a 1-bit error. When an error of equal to or more than 2 bits is detected, an error notification E is generated for the control device 33. The error notification E may be realized by generating an interrupt to the CPU included in the control device 33, or may be realized by communicating with the control device 33 via the control upper-level bus Buc. The address where the error is detected and the information indicating the content of the error are temporarily stored so that the address and the information can be provided by communication with the control device 33 via the control upper-level bus Buc.

The access control unit 323 at least executes the PHY control processing according to a higher-level command, which is a command transmitted to and received from the control device 33 via the upper-level control bus Buc.

As shown in FIG. 4, a higher-level command includes at least an initialization command and an execution command.

The initialization command is a command for writing the PHY command to the command storage unit 322. The initialization command includes a "command type", a "target register", and "write data". The "command type" is information indicating that the command is an initialization command, and a predetermined value is used. The "target register" is information for identifying a command register to be initialized, and for example, an address of the command storage unit 322, a number associated with the address, or the like is used. The "write data" is the PHY command itself stored in the command register identified by the "target register".

The execution command is a command for causing the network switch 32 to execute access to the PHY 31. The execution command includes a "command type", a "target register", and a "target PHY". The "command type" is information indicating that the command is an execution command, and a predetermined value is used. The "target register" is information for identifying a command register in which a PHY command to be executed is stored, and is similar to the "target register" of the initialization command. The "target PHY" is information indicating which PHY 31 of the plurality of PHYs 31 the PHY command is to be executed for.

The "target register" corresponds to command designation information, the "target PHY" corresponds to device designation information, and the execution command corresponds to a simple command.

(1-2-1. PHY Control Processing)

Figure 5:
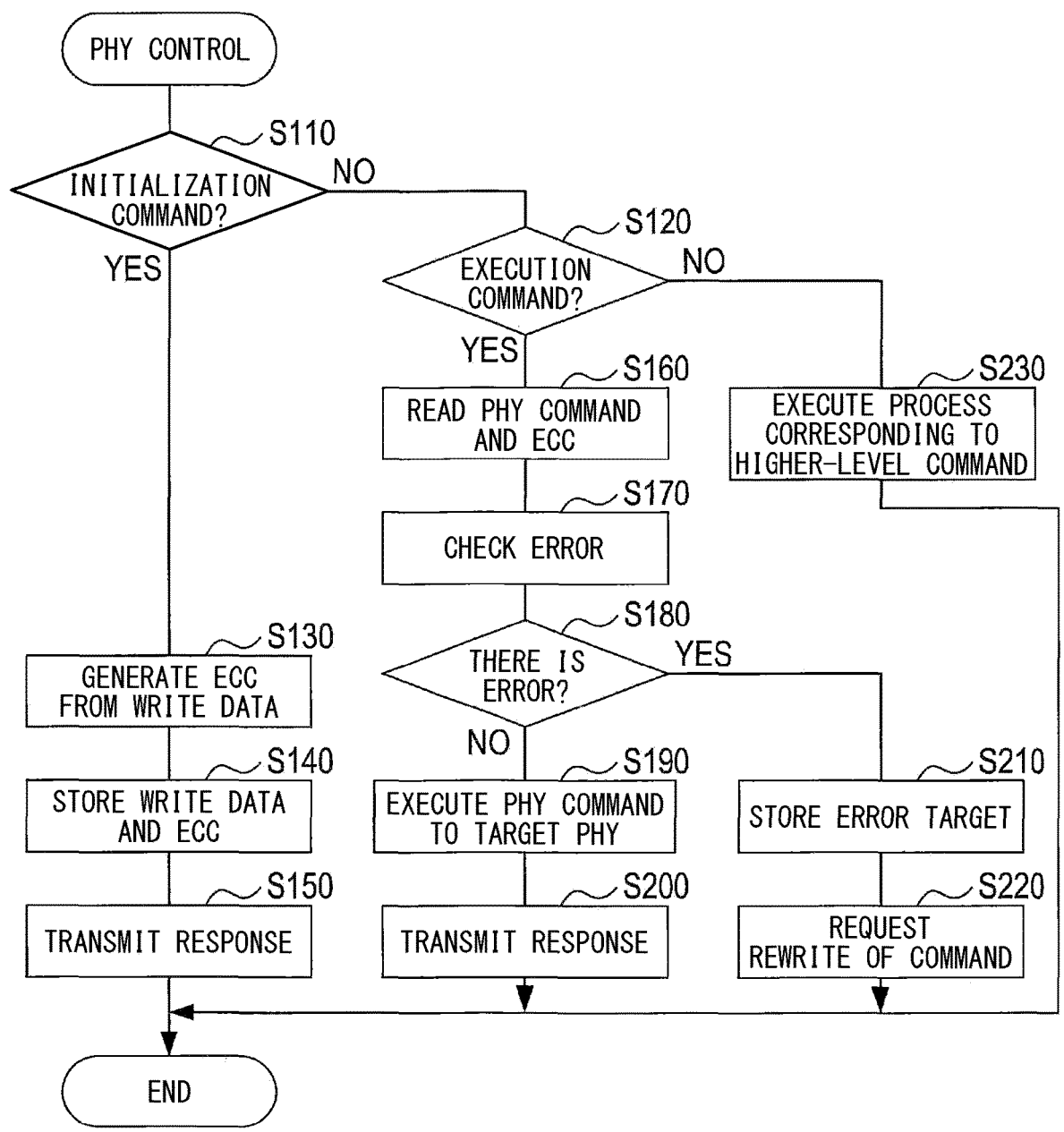
FIG. 5 is a flowchart of a PHY control processing.

The PHY control processing executed by the access control unit 323 will be described with reference to the flowchart shown in FIG. 5. The PHY control processing is activated when the higher-level command is received from the control device 33.

When the PHY control processing is activated, in S110, the access control unit 323 determines whether the received higher-level command is an initialization command. When determining that the received higher-level command is an initialization command, the processing proceeds to S130. When not determining that the received higher-level command is an initialization command, the processing proceeds to S120.

In S130, the access control unit 323 generates the ECC from the "write data" (that is, the PHY command) indicated in the initialization command.

In the following S140, the access control unit 323 causes the command register of the command storage unit 322 corresponding to the "target register" indicated in the initialization command to register the "write data" indicated in the initialization command and the ECC generated in S130.

In the following S150, a response indicating that the initialization command has been executed is transmitted to the control device 33, and the processing is terminated.

In S120, the access control unit 323 determines whether the received higher-level command is an execution command. When determining that the received higher-level command is an execution command, the processing proceeds to S160. When not determining that the received higher-level command is an execution command, the processing proceeds to S230.

In S160, the access control unit 323 reads the PHY command and the ECC from the command register of the command storage unit 322 corresponding to the "target register" indicated in the execution command.

In the following S170, the access control unit 323 generates an ECC from the PHY command read in S170, and compares the generated ECC with the ECC read in S160 to perform an error check. Specifically, the access control unit 323 determines whether the generated ECC matches with the stored ECC. However, even when the access control unit 323 determines that the generated ECC mismatches with the stored ECC, in a case where the error is a 1-bit error, the access control unit 323 determines that the read PHY command has no error by correcting the error using the ECC, and, in a case where the error is equal to or more than two bits, the access control unit 323 determines that the read PHY command has an error.

In the following S180, the access control unit 323 determines whether an error has been detected as a result of the error check in S170. When the access control unit 323 does not determine that an error has been detected, the processing proceeds to S190. When the access control unit 323 determines that an error has been detected, the processing proceeds to S210.

In S190, the access control unit 323 executes the PHY command read in S160 for the PHY 31 identified from the "target PHY" indicated in the execution command.

In the following S200, the access control unit 323 transmits a response to the higher-level command received from the control device 33, and the processing is terminated. The response to the higher-level command is a notification indicating the end of execution when the executed PHY command is a write command, and a notification indicating the content of the read data when the executed PHY command is a read command.

In S210, the access control unit 323 stores information for identifying the command register in which an error is detected so as to provide the information in response to a request from the control device 33. At this time, the PHY command and the ECC read from the command storage unit 322 may also be stored as the information necessary for error analysis.

In the following S220, the access control unit 323 transmits an error notification E for requesting the control device 33 to rewrite the PHY command to the command register in which the error is detected, and the processing is terminated.

In S230, the access control unit 323 executes the process corresponding to the received higher-level command and the processing is terminated. When there is no higher-level command other than the initialization command and the execution command, this process may be omitted. In the PHY control processing, S110 and S130 to S150 correspond to a command writing unit.

(1-3. Control Device)

Returning to FIG. 2, the control device 33 includes a microcomputer having a CPU 331 and, for example, a semiconductor memory such as a RAM or ROM (hereinafter, memory 332).

The control device 33 executes at least an initialization processing, a communication monitor processing, a line monitor processing, and an abnormality storage processing.

(1-3-1. Initialization Processing)

When the power is turned on to the line monitor device 3 and the control device 33 is activated, the control device 33 executes the initialization processing.

When the initialization processing is started, the control device 33 causes the command storage unit 322 of the network switch 32 to store the PHY command using the initialization command.

The control device 33 has a table showing a correspondence between the PHY command and the "target register" that identifies the command register that stores the PHY command.

Further, the control device 33 initializes, in the initialization processing, a PHY state used in the line monitor processing. Here, it is defined, as the PHY state, that a state where a link of line is connected is a link-up, and a state where a link of line is disconnected is a link-down. The PHY state is initialized to the link-down.

(1-3-2. Communication Monitor Processing)

Figure 6:
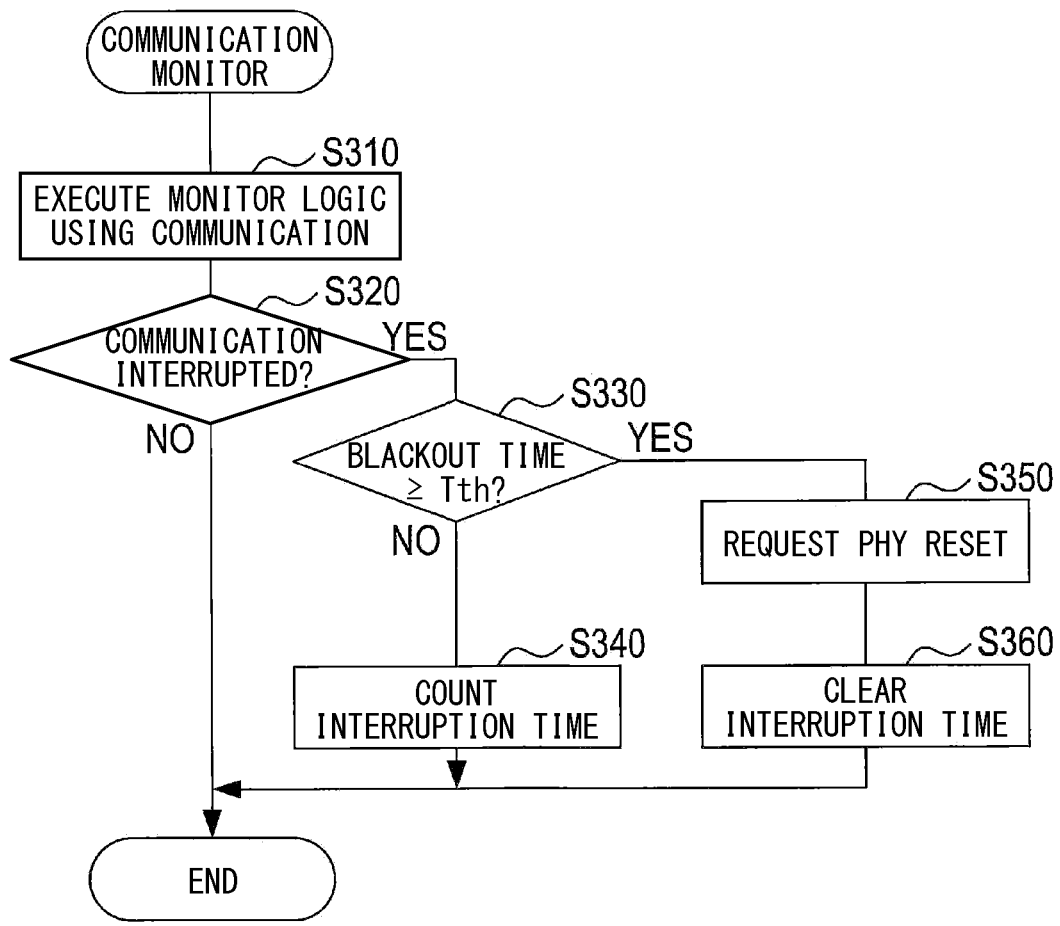
FIG. 6 is a flowchart of a communication monitor processing according to a first embodiment.

The communication monitor processing executed by the control device 33 will be described with reference to the flowchart of FIG. 6. The control device 33 repeatedly executes the communication monitor processing after the initialization processing is completed. The communication monitor processing is executed for each external port P, that is, for each data lower-level port Pld. In the following, the external port P to be processed is referred to as a target port.

When the communication monitor processing is started, in S310, the control device 33 detects the communication status of the target port by executing the monitor logic using the communication. For example, when a communication frame is transmitted to a line connected to a target port, the control device 33 monitors whether a response identified by a communication protocol is returned from the line. This information is collected from the routing unit 321 via the data upper-level bus Bud.

In the following S320, the control device 33 determines whether a state where communication is interrupted is detected by the monitor in S310. When the control device 33 does not determine that the communication is interrupted, the processing is temporarily terminated. When the control device 33 determines that the communication is interrupted, the processing proceeds to S330.

In S330, the control device 33 determines whether an interruption time, which is the elapsed time from the first detection of the communication interruption, is equal to or greater than a predetermined threshold value Tth. When the control device 33 determines that the interruption time is less than the threshold value Tth, the processing proceeds to S340. When the control device 33 determines that the interruption time is equal to or more than the threshold value Tth, the processing proceeds to S350.

In S340, the control device 33 counts the interruption time and temporarily terminates the processing.

In S350, the control device 33 generates a PHY reset request, which is a reset request for the PHY 13 connected to the target port. The PHY reset request is used in the line monitor processing described later.

In the following S360, the control device 33 clears the interruption time and temporarily terminates the processing.

(1-3-3. Line Monitor Processing)

Figure 7:
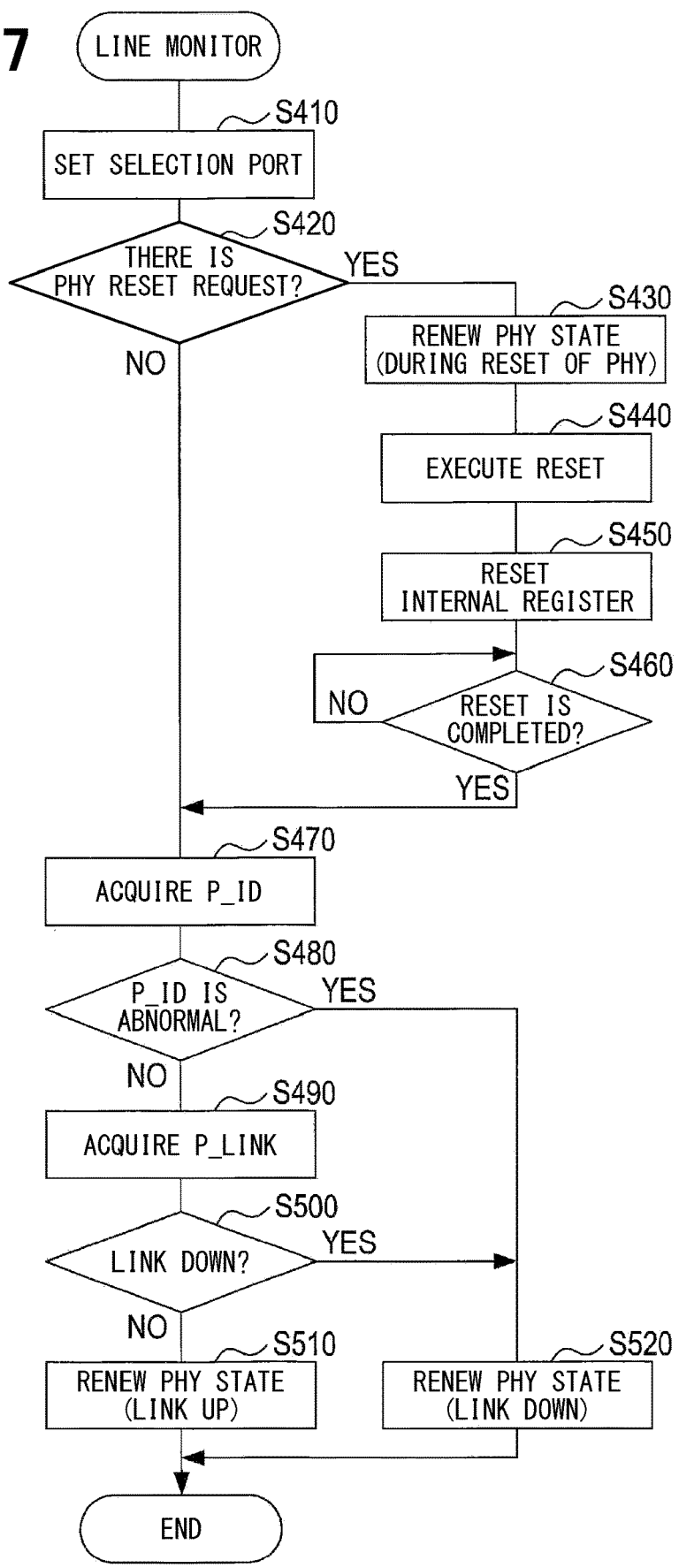
FIG. 7 is a flowchart of a line monitor processing according to the first embodiment.

The line monitor processing executed by the control device 33 will be described with reference to the flowchart of FIG. 7. The control device 33 repeatedly executes the line monitor processing after the initialization processing is completed.

When the line monitor processing is started, in S410, the control device 33 sets any of the plurality of external ports P as a selected port. As the selected port, a different port is selected in order each time the line monitor processing is executed.

In the following S420, the control device 33 determines whether a PHY reset request for the selected port has been generated by the communication monitor processing described above. When the control device 33 does not determine that a PHY reset request has been generated, the processing proceeds to S470. When the control device 33 determines that a PHY reset request has been generated, the processing proceeds to S430.

In S430, the control device 33 updates the PHY state of the selected port to the PHY reset.

In the following S440, the control device 33 executes a reset for the PHY 13 connected to the selected port (hereinafter referred to as a selected PHY). Specifically, an execution command in which the selected PHY is set as the "target PHY" and the command register storing the PHY_RESET command is set as the "target register" is transmitted to the network switch 32 via the control upper-level bus Buc.

In the following S450, the control device 33 resets the internal register of the selected PHY. Specifically, an execution command in which the selected PHY is set as the "target PHY" and the command register storing the PHY_REG_SET command is set as the "target register" is transmitted to the network switch 32. The reset of the internal register may be performed for multiple internal registers.

In the following S460, the control device 33 determines whether the reset of the selected PHY is completed. Specifically, the determination is made by checking the response returned from the network switch 32 when the PHY command is executed. When the control device 33 does not determine that the reset of the selected PHY is completed, the control device 33 repeats the same process. When the control device 33 determines that the reset of the selected PHY is completed, the processing proceeds to S470.

In S470, the control device 33 acquires the identification information P_ID of the selected PHY. Specifically, an execution command in which the selected PHY is set as the "target PHY" and the command register storing the PHY_ID command is set as the "target register" is transmitted to the network switch 32. The access control unit 323 of the network switch 32, which receives the execution command, returns the identification information P_ID read from the internal register to the control device 33 by executing the PHY_ID command for the selected PHY.

In S480, the control device 33 determines whether the identification information P_ID of the selected PHY acquired in S470 has an abnormality. When the control device 33 determines that there is no abnormality in the identification information P_ID, it assumes that there is no abnormality in the selected PHY and the processing proceeds to S490. When the control device 33 determines that there is an abnormality in the identification information P_ID, it assumes that there is an abnormality in the selected PHY and the processing proceeds to S520.

In S490, the control device 33 acquires the link state P_LINK of the selected PHY. Specifically, an execution command in which the selected PHY is set as the "target PHY" and the command register storing the PHY_LINK command is set as the "target register" is transmitted to the network switch 32. The access control unit 323 of the network switch 32, which receives the execution command, returns the link state P_LINK read from the internal register to the control device 33 by executing the PHY_LINK command for the selected PHY.

In the following S500, the control device 33 determines whether the link state P_LINK of the selected PHY acquired in S490 is in the link-down. When the control device 33 determines that the link state P_LINK is not in the link-down, that is, the link state P_LINK is in the link-up, the processing proceeds to S510. When the control device 33 determines that the link state P_LINK is in the link-down, the processing proceeds to S520.

In S510, the control device 33 updates the PHY state of the selected PHY to the link-up, and temporarily terminates the processing.

In S520, the control device 33 updates the PHY state of the selected PHY to the link-down, and temporarily terminates the processing.

(1-3-4. Abnormality Storage Processing)

Figure 8:
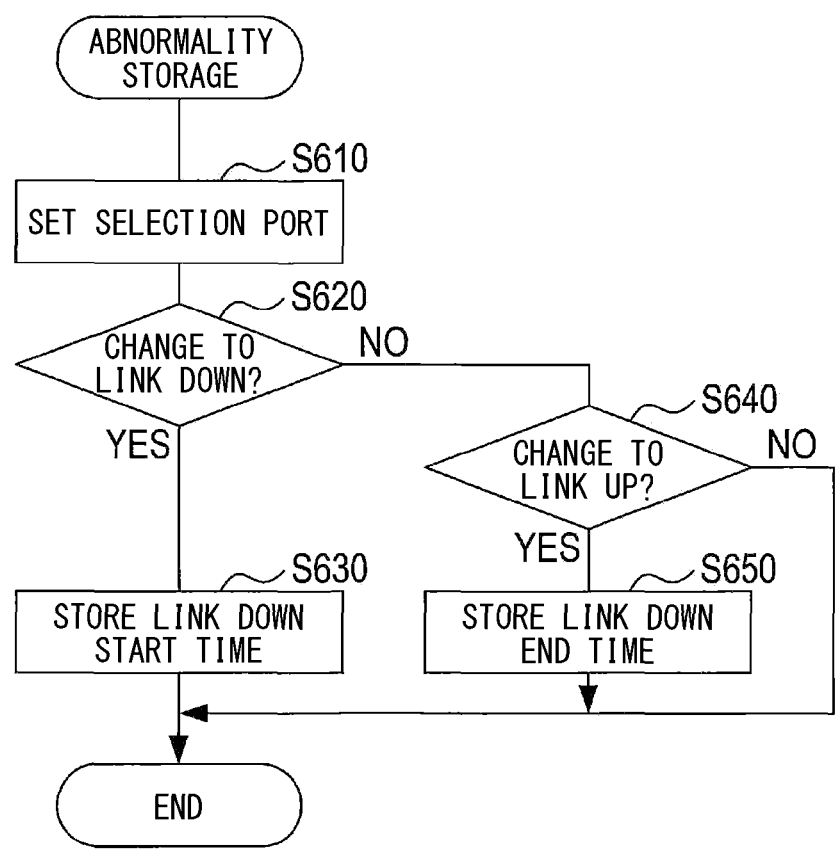
FIG. 8 is a flowchart of an abnormality storage processing according to the first embodiment.

The abnormality storage processing executed by the control device 33 will be described with reference to the flowchart of FIG. 8. The control device 33 repeatedly executes the abnormality storage processing after the initialization processing is completed.

When the abnormality storage processing is started, in S610, the control device 33 sets any of the plurality of external ports P as a selected port. As the selected port, a different port is selected in order each time the line monitor processing is executed.

In the following S620, the control device 33 determines whether the PHY state set and updated in the line monitor processing is changed to the link-down for the selected port. When the control device 33 determines that the PHY state is changed to the link-down, the processing proceeds to S630. When the control device 33 determines that the PHY state is not changed to the link-down, the processing proceeds to S640.

In S630, the control device 33 stores the start time of the link-down in a predetermined area of the memory 332, and temporarily terminates the processing.

In S640, the control device 33 determines whether the PHY state of the selected port is changed to the link-up. When the control device 33 determines that the PHY state is changed to the link-up, the processing proceeds to S650. When the control device 33 determines that the PHY state is not changed to the link-up, the control device 33 temporarily terminates the processing.

In S650, the control device 33 stores the end time of the link-down in a predetermined area of the memory 332, and temporarily terminates the processing.

(1-4. Effects)

According to the first embodiment detailed above, the following effects may be obtained.

(1a) In the line monitor device 3, the control device 33 transmits the execution command (that is, a simple command) for designating the "target register" and the "target PHY" to the network switch 32. The network switch 32 executes the PHY command read from the command register corresponding to the "target register" to the PHY 31 identified by the "target PHY".

Therefore, the control device 33 performs transmission and reception of the PHY command with the network switch 32 when the command storage unit 322 stores the PHY command. When the control device 33 executes the line monitor, the control device 33 transmits the "target register" instead of the PHY command. Therefore, the amount of communication between the control device 33 and the network switch 32 can be reduced. As a result, a more remarkable effect can be obtained in an application that requires high-frequency monitor of the PHY 31, such as an in-vehicle network system 1 related to an automatic driving function or the like.

(1b) The network switch 32 includes the command storage unit 322 that stores the PHY command. The change of the specification of the PHY 31 or the like can be performed by simply changing the PHY command stored in the command storage unit 322. Thus, the change of the specification of the PHY 31 or the like can be performed without change of design for the hardware.

(1c) The control device 33 not only checks the link state P_LINK of the line, but also checks the identification information P_ID of the PHY 31. Therefore, the configuration can determine whether the cause of the link-down is on the own device side or the communication partner side.

(1d) The control device 33 resets the PHY 31 and restores communication when the cause of the link-down is on the own device side. Therefore, when the cause is on the communication partner side, the configuration can inhibit the PHY 31 on the own device side from being unnecessarily reset. In addition, the configuration can inhibit delay in the recovery of communication due to an unnecessary reset and interruption of the execution of the line monitor processing. That is, the control lower-level bus Blc is commonly connected to all PHYs 31. When any of the PHYs 31 is reset, the control lower-level bus Blc will be occupied due to the reset of the internal register or the like. The configuration can avoid such a situation as much as possible.

(1e) The command storage unit 322 is configured by using the ECC memory. Therefore, when the stored value is garbled, in a case where the error is a 1-bit error, the 1-bit error is automatically corrected, and it is not necessary to reset the stored value. Therefore, the reliability and operation rate of the operation of the network switch 32 can be improved. Further, in a case where the error is equal to or more than two bits, the configuration notifies the control device 33 and the stored contents of the command storage unit 322 are reset. Thus, the configuration can further improve the reliability.

(1f) Since the command storage unit 322 stores the command in combination with the write data, the configuration can realize not only reading the internal register of the PHY 31 but also writing various settings to the internal register of the PHY 31.

2. Second Embodiment (2-1. Difference from the First Embodiment)

Since the basic configuration of a second embodiment is similar to the first embodiment, the difference will be described below. Note that the same reference numerals as those in the first embodiment indicate the same configuration, and refer to the preceding descriptions.

In the first embodiment described above, the control device 33 executes a communication monitor processing for determining whether to reset the PHY 31 and an abnormality storage processing for storing the line abnormality separately from the line monitor processing. On the other hand, the second embodiment is different from the first embodiment in that one line monitor processing, instead of three processings, in which functions corresponding to the communication monitor processing and the abnormality storage processing are integrated is executed.

(2-2. Line Monitor Processing)

The line monitor processing executed by the control device 33 will be described with reference to the flowchart of FIG. 9. The control device 33 repeatedly executes the line monitor processing after the initialization processing is completed.

When the line monitor processing is started, in S710, the control device 33 sets any of the plurality of external ports P as a selected port. As the selected port, a different port is selected in order each time the line monitor processing is executed.

In the following S720, the control device 33 acquires the identification information P_ID of the selected PHY. The details are similar to those described in S470 above.

In the following S730, the control device 33 determines whether the identification information P_ID of the selected PHY acquired in S720 has an abnormality. When the control device 33 determines that there is no abnormality in the identification information P_ID, it assumes that there is no abnormality in the selected PHY and the processing proceeds to S790. When the control device 33 determines that there is an abnormality in the identification information P_ID, it assumes that there is an abnormality in the selected PHY and the processing proceeds to S740.

In S740, the control device 33 counts the ID abnormality continuous number Cid.

In the following S750, the control device 33 determines whether the ID abnormality continuous number Cid is equal to or greater than a predetermined threshold value C1. When the control device 33 determines that Cid≥C1 is satisfied, the processing proceeds to S760. When the control device 33 determines that Cid<C1 is satisfied, the control device 33 terminates the processing.

In S760, the control device 33 executes a reset for the selected PHY that is the PHY 13 connected to the selected port. The details are similar to those described in S440 above.

In the following S770, the control device 33 resets the internal register of the selected PHY. The details are similar to those described in S450 above.

In the following S780, the control device 33 stores, as diagnostic information related to the selected PHY, the fact that an abnormality in the identification information P_ID has occurred in a predetermined area of the memory 332, and temporarily terminates the processing.

In S790, the control device 33 clears the ID abnormality continuous number Cid.

In S800, the control device 33 acquires the link state P_LINK of the selected PHY. The details are similar to those described in S490 above.

In the following S810, the control device 33 determines whether the link state P_LINK of the selected PHY acquired in S800 is in the link-down. When the control device 33 determines that the link state P_LINK is in the link-down, the processing proceeds to S820. When the control device 33 determines that the link state P_LINK is not in the link-down, the processing proceeds to S870.

In S870, the control device 33 clears the link abnormality continuous number Clk and temporarily terminates the processing.

In S820, the control device 33 counts the link abnormality continuous number Clk.

In S830, the control device 33 determines whether the link abnormality continuous number Clk is equal to or greater than a predetermined threshold value C2. When the control device 33 determines that Clk C2 is satisfied, the processing proceeds to S840. When the control device 33 determines that Clk<C2 is satisfied, the control device 33 terminates the processing.

In S840, the control device 33 stores, as the diagnostic information related to the selected PHY, the fact that an abnormality in the link (that is, the line-down) has occurred in a predetermined area of the memory 332.

In the following S860, the control device 33 acquires the device information P_INF of the selected PHY. Specifically, an execution command in which the selected PHY is set as the "target PHY" and the command register storing the PHY_INF command is set as the "target register" is transmitted to the network switch 32. The access control unit 323 of the network switch 32 which receives the execution command returns the device information PHY_INF read from the internal register to the control device 33 by executing the PHY_INF command for the selected PHY.

In the following S870, the control device 33 stores, as the diagnostic information related to the selected PHY, the PHY information acquired in S860 in a predetermined area of the memory 332, and temporarily terminates the processing.

(2-3. Effects)

The second embodiment described in detail above provides the effects (1a) through (1f) described in the first embodiment and the following effect in addition.

(2a) Since the necessity of reset of the PHY 31 is realized not by the upper-level layer logic using communication but by the lower-level layer logic that confirms the state of the PHY 31, the processing load on the control device 33 can be further reduced.

3. Other Embodiments

Although the embodiments of the present disclosure have been described above, the present disclosure is not limited to the embodiments described above, and various modifications can be made to implement the present disclosure.

(3a) In the above embodiment, the storage content of the command storage unit 322 is set in response to an instruction from the control device 33 at the time of initialization, but the present disclosure is not limited thereto. For example, the content to be stored in the command storage unit 322 is stored in a separately prepared non-volatile memory such as a flash memory, and is automatically transferred from the non-volatile memory to the command storage unit 322 when the network switch 32 is activated.

(3b) In the above embodiment, the command storage unit 322 is provided by the ECC memory, but the present disclosure is not limited to thereto. For example, the command storage unit 322 is provided by a memory having no error correction function. In this case, the command storage unit 322 stores the same two PHY commands. When the two values does not match with each other in a case where the PHY command is read, the control device 33 is notified and the stored contents of the command storage unit 322 are reset.

(3c) In the above embodiment, the network switch 32 individually responds to an execution command from the control device 33, but the present disclosure is not limited thereto. For example, a function for queuing the execution command is added to the network switch 32, and the network switch 32 responds to a plurality of execution commands at once.

(3d) In the above embodiment, the case where the PHY 31 is not restored even when the reset is executed is not particularly mentioned. However, for example, when the PHY 31 reset is executed for a plurality of times but the recovery is not achieved, the control device 33 and the network switch 32 may be reset. In this case, it is possible to deal with the case where the control lower-level bus Blc or the control upper-level bus Buc is stuck.

(3a) The control device 33 and the technique according to the present disclosure may be achieved by a dedicated computer provided by constituting a processor and a memory programmed to execute one or more functions embodied by a computer program. Alternatively, the control device 33 and the technique according to the present disclosure may be achieved by a dedicated computer provided by constituting a processor with one or more dedicated hardware logic circuits. Alternatively, the control device 33 and the technique according to the present disclosure may be achieved using one or more dedicated computers constituted by a combination of the processor and the memory programmed to execute one or more functions and the processor with one or more hardware logic circuits. Further, the computer program may be stored in a computer-readable non-transitory tangible storage medium as instructions to be executed by a computer. The technique for realizing the functions of the respective units included in the control device 33 does not necessarily need to include software, and all of the functions may be realized with the use of one or multiple hardware.

(3f) A plurality of functions of one element in the above embodiment may be implemented by a plurality of elements, or one function of one element may be implemented by a plurality of elements. In addition, multiple functions of multiple components may be realized by one component, or a single function realized by multiple components may be realized by one component. A part of the configuration of the above embodiment may be omitted. At least a part of the configuration of the above embodiments may be added to or replaced with the configuration of another one of the above embodiments.

(3g) In addition to the above-mentioned line monitor device and network switch, various embodiments such as a system having the line monitor device and network switch as a component, a program for operating a computer as a control device in the line monitor device, the non-transitory tangible storage medium such as the semiconductor memory in which the program is stored or a line monitor method may implement the present disclosure.

What is claimed is:

1. A line monitor device comprising:
a network switch that includes a plurality of ports each connected to a network or a terminal, and is configured to perform routing between the plurality of ports; and
a control device that is apart from the network switch, and is configured to control the network switch, wherein
the network switch includes:
a command storage unit configured to store a plurality of commands acquired from the control device for physical devices such that the plurality of commands correspond to command designation information predetermined, the physical devices being correspondingly provided for the plurality of ports and each realizing a physical layer,
an access control unit, when acquiring device designation information that designates one of the physical devices and a simple command that includes the command designation information from the control device, configured to read a command from the command storage unit based on the command designation information indicated by the simple command and execute the command to the physical device designated by the device designation information indicated by the simple command,
the control device instructs the command storage unit to write the plurality of commands using an initialization command for writing the plurality of commands to the command storage unit, and
the control device performs a line monitoring processing that monitors a line connected to each of the physical devices using the simple command.

2. The line monitor device according to claim 1, wherein the plurality of commands stored in the command storage unit include at least a command for reading identification information for individually identifying the physical device.

3. The line monitor device according to claim 1, wherein the plurality of commands stored in the command storage unit include at least a command for reading a link state of the physical device.

4. The line monitor device according to claim 1, wherein the plurality of commands stored in the command storage unit include at least a command for writing a setting of the physical device.

5. The line monitor device according to claim 1, wherein the command storage unit is provided by a memory having a function of performing an error detection or an error correction of stored contents.

6. The line monitor device according to claim 1, further comprising a command writing unit configured to write the command to the command storage unit in response to an instruction of the control device.

7. The line monitor device according to claim 1, wherein:
the plurality of commands stored in the command storage unit include at least a Physical Layer Identification Information (PHYID) command for reading identification information of the physical device and a Physical Layer Reset (PHY RESET) command for resetting the physical device,
the control device acquires, as a line monitor processing, the identification information of the physical device from each physical device by executing the PHYID command to the network switch using the simple command, and
when the identification information acquired has an abnormality, the control device resets the physical device that having the abnormality by causing the network switch to execute the PHY_RESET command using the simple command.

8. The line monitor device according to claim 1, wherein:
the plurality of commands stored in the command storage unit include attribute information indicating whether an access type of the command is read or write, an address indicating an internal register of the physical device, and data activated when the attribute information is write and to be written to the internal register indicated by the address, and
the simple command includes an access type indicating the simple command, the command designation information, and the device designation information.

9. The line monitor device according to claim 1, wherein the control device transmits the initialization command to the network switch when power of the line monitor device is turned on and the control device is activated.

10. A network switch realized by hardware including a Field Programmable Gate Array (FPGA) comprising:
a plurality of ports each connected to a network or a terminal, wherein the network switch is configured to perform routing between the plurality of ports,
a command storage unit configured to store a plurality of commands for physical devices acquired from a control device that controls the network switch such that the plurality of commands correspond to command designation information predetermined, the physical devices being correspondingly provided for the plurality of ports and each realizing a physical layer, and
an access control unit, when acquiring device designation information that designates one of the physical devices and simple command that includes the command designation information from the control device, configured to read a command from the command storage unit based on the command designation information indicated by the simple command and execute the command to the physical device designated by the device designation information indicated by the simple command.

11. The network switch according to claim 10, wherein the plurality of commands stored in the command storage unit include at least a command for reading identification information for individually identifying the physical device.

12. The network switch according to claim 10, wherein the plurality of commands stored in the command storage unit include at least a command for reading a link state of the physical device.

13. The network switch according to claim 10, wherein the plurality of commands stored in the command storage unit include at least a command for writing a setting of the physical device.

14. The network switch according to claim 10, wherein the command storage unit is provided by a memory having a function of performing an error detection or an error correction of stored contents.

15. The network switch according to claim 10, further comprising
a command writing unit configured to write the command to the command storage unit in response to an instruction of the control device.

16. The network switch according to claim 10, wherein the plurality of commands stored in the command storage unit includes at least:
a command for reading identification information for individually identifying the physical device, and
a command for resetting the physical device at least when an abnormality is detected in the identification information acquired by the control device, when the control device detects a communication interruption at any of the plurality of ports, and when the control device generates a reset request.

17. A network switch comprising:
a plurality of ports each connected to a network or a terminal, wherein the network switch is configured to perform routing between the plurality of ports,
a memory configured to store a plurality of commands for physical devices acquired from a control device that controls the network switch such that the plurality of commands correspond to command designation information predetermined, the physical device being provided for each of the plurality of ports and realizing a physical layer, and
a processor, when acquiring device designation information that designates one of the physical devices and simple command that has the command designation information from the control device, configured to read a command from the memory based on the command designation information indicated by the simple command and execute the command to the physical device designated by the device designation information indicated by the simple command.

* * * * *